United States Patent [19]

Uzunoglu

[11] 4,355,404
[45] Oct. 19, 1982

[54] CARRIER RECOVERY NETWORK FOR QPSK MODEMS EMPLOYING SYNCHRONIZED OSCILLATORS

[75] Inventor: Vasil Uzunoglu, Ellicott City, Md.

[73] Assignee: Communications Satellite Corporation, Washington, D.C.

[21] Appl. No.: 153,289

[22] Filed: May 27, 1980

[51] Int. Cl.³ .................... H03B 5/12; H03D 7/16
[52] U.S. Cl. ........................... 375/86; 375/97; 455/22; 455/316; 331/117 R
[58] Field of Search ............. 455/22, 23, 112, 113, 455/316; 375/85, 86, 97; 331/1 A, 8, 11, 31, 117 R; 329/50, 122

[56] References Cited

U.S. PATENT DOCUMENTS

| | | | |
|---|---|---|---|
| 2,777,055 | 1/1957 | Goldberg | 455/316 |
| 2,824,964 | 2/1958 | Yin | 331/117 |
| 2,836,724 | 5/1958 | Kaminow | 331/117 |
| 2,942,203 | 6/1960 | Winkler | 331/31 |
| 3,080,525 | 3/1963 | Davis, Jr. | 328/38 |
| 3,199,028 | 8/1965 | Melin et al. | 455/113 |
| 3,204,185 | 8/1965 | Robinson | 329/124 |
| 3,354,325 | 11/1967 | Isborn | 307/331 |
| 3,369,194 | 2/1968 | Anderson | 331/113 |
| 3,449,656 | 6/1969 | Grieninger | 321/66 |
| 3,480,880 | 11/1969 | Starr, Jr. | 331/109 |
| 3,525,945 | 8/1970 | Puente | 329/50 |
| 3,593,150 | 7/1971 | Michishita et al. | 455/316 |
| 3,594,651 | 7/1971 | Wolejsza, Jr. | 329/104 |
| 3,629,727 | 12/1971 | Berney | 331/117 R |
| 3,671,775 | 6/1972 | Kam | 307/271 |
| 3,737,578 | 6/1973 | Matsuo | 375/86 |

Primary Examiner—Benedict V. Safourek
Attorney, Agent, or Firm—Sughrue, Mion, Zinn, Macpeak & Seas

[57] ABSTRACT

A carrier recovery network for QPSK modems employs a synchronous oscillator which may be used as a frequency multiplier, divider and tracking bandpass filter. A preferred embodiment of the carrier recovery network includes a multiply-by-four circuit to remove QPSK data modulation, and a synchronous oscillator tuned to one-fourth the input frequency to thereby act as a frequency divider and tracking bandpass filter to provide a recovered carrier signal.

31 Claims, 16 Drawing Figures

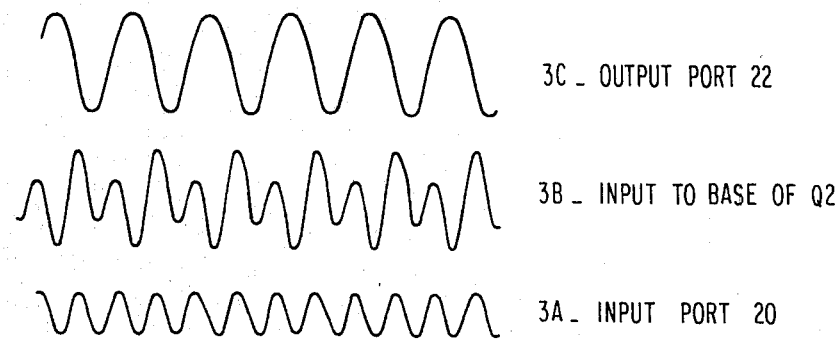
FIG.3 DIVIDE BY 2
3C — OUTPUT PORT 22
3B — INPUT TO BASE OF Q2
3A — INPUT PORT 20
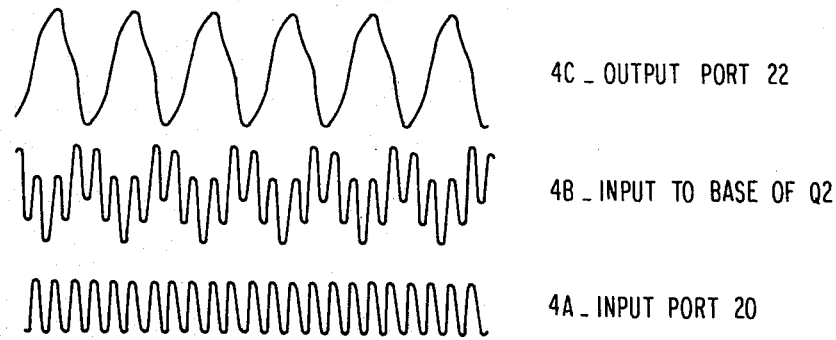
FIG.4 DIVIDE BY 4
4C — OUTPUT PORT 22
4B — INPUT TO BASE OF Q2
4A — INPUT PORT 20
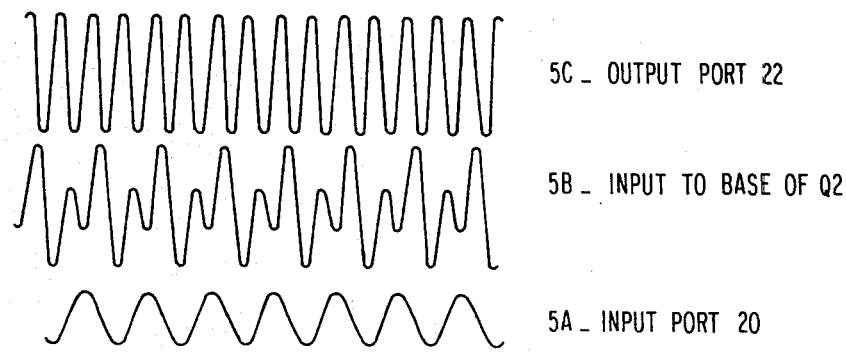
FIG.5 MULTIPLY BY 2
5C — OUTPUT PORT 22
5B — INPUT TO BASE OF Q2
5A — INPUT PORT 20

FIG. 6 MULTIPLY BY 4
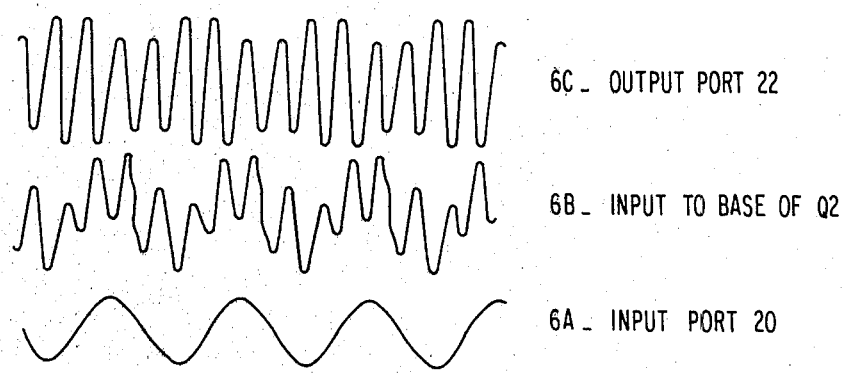
6C – OUTPUT PORT 22
6B – INPUT TO BASE OF Q2
6A – INPUT PORT 20
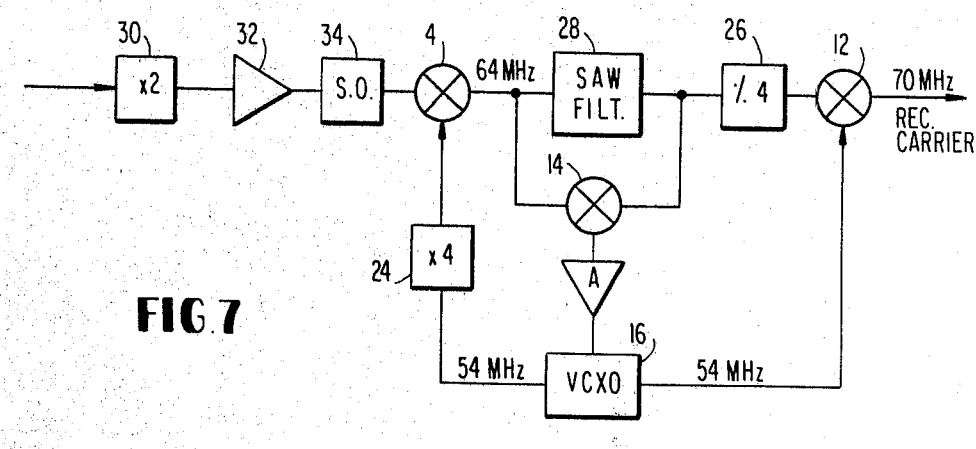
FIG. 7
FIG. 8
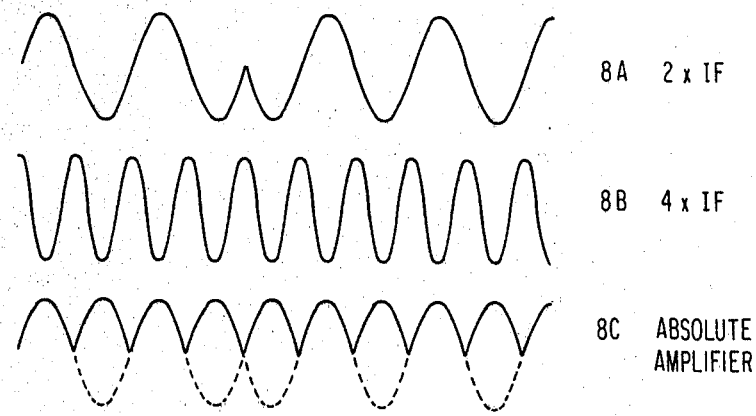
8A  2 x IF
8B  4 x IF
8C  ABSOLUTE AMPLIFIER $E_b/N_0$ vs BER $E_b/N_0$ vs BER
FOR FREQUENCY DEVIATIONS INPUT vs BANDWIDTH OF A SYNCHRONOUS OSCILLATOR PHASE vs FREQUENCY VARIATION FOR A SIMPLE TUNED CIRCUIT

CARRIER RECOVERY NETWORK FOR QPSK MODEMS EMPLOYING SYNCHRONIZED OSCILLATORS

BACKGROUND OF THE INVENTION

1. Field of the Invention

The present invention relates to the field of satellite communications and more particularly to carrier recovery networks utilized in quartenary phase shift keyed (QPSK) modems.

2. Prior Art

One of the widely used carrier recovery networks in a QPSK modem is illustrated in FIG. 1. A 70 MHz IF signal having quartenary phase shift keyed data modulation impressed thereon is applied to a multiplier 2 which multiples the IF data signal by 4 to thereby remove the data modulation. The signal is multiplied by 4 in the case of QPSK, while a multiplication factor of 2 would be employed with binary phase shift keyed (BPSK) modulation. The multiplied IF signal at 280 MHz is applied to mixer 4 where it is mixed with a 216 MHz signal to provide a nominally 64 MHz signal. The 64 MHz signal is passed through bandpass filter 6 and applied to divider 8 which divides the 64 MHz signal by 4. The output of divider 8 at 16 MHz is applied to one input of mixer 12, the other input having a 54 MHz signal applied thereto. Mixer 12 provides the sum frequency of 70 MHz as the received carrier signal.

The prior art carrier recovery network is supplied with an automatic frequency loop 10 since the carrier frequency of 70 MHz is subject to drift. The carrier recovery network locks the phase of the carrier in the AFC loop by applying input and output signals of the bandpass filter 6 to mixer 14 to provide phase information to voltage controlled crystal oscillator 16 which in turn varies the nominally 54 MHz output signal. This 54 MHz signal is applied to multiplier 18 which multiplies by 4 to deliver the 216 MHz signal to mixer 4.

Although the prior art recovery network shown in FIG. 1 works fairly well at higher S/N ratio, it introduces jitter and noise to the recovered carrier the S/N ratio drops, especially in time division multiple access (TDMA) operation, due to the intermittent nature of TDMA communications. Reducing the bandwidth of the 64 MHz filter results in a poor response, sluggishness, and increased bit error rate (BER). Furthermore, multipliers such as multipliers 2 and 18 and dividers, such as divider 8, are limiting elements in the proper functioning of carrier recovery networks used in QPSK or higher level modems. Presently available dividers are limited by the state of the art of solid state counters which do not exceed a few hundred MHz. Furthermore, each non-linear multiplication by 2 degrades the S/N ratio by at least 6 dB. The operation of digital dividers is degraded under noisy and jittery conditions, and skipping is caused in the recovered carrier.

SUMMARY OF THE INVENTION

The present invention is directed to a carrier recovery network of greatly simplified construction which is able to track both high and low frequency carriers without the inherent disadvantages of the prior art carrier recovery network.

The present invention is also directed to the particular and specific apparatus which enables the above-mentioned simplified carrier recovery network in accordance with the present invention to operate over a relatively wide range of conditions. More specifically, the apparatus enabling the carrier recovery network in accordance with the present invention to operate in such a manner comprises a synchronous oscillator. The synchronous oscillator performs a number of functions which readily lend themselves to operation in a carrier recovery network. Specifically, the synchronous oscillator in accordance with the present invention provides synchronization capability so that carrier drift may be tracked by the carrier recovery network. The synchronous oscillator also provides frequency division and multiplication capabilities as well as a bandpass filtering capability, the Q of the bandpass filter being adjustable. Furthermore, the filtering characteristics of the synchronous oscillator allow a substantially constant signal-to-noise ratio level over a wide variety of operating conditions since the bandwidth of the filter is reduced as the signal input level is reduced. Furthermore, since amplitude variations only effect the synchronous oscillator filter bandwidth, the output of the synchronous oscillator is substantially of constant amplitude, thereby obviating the need for automatic gain control circuitry.

The synchronous oscillator may be used in one of several carrier recovery networks in accordance with the present invention. The prior art carrier recovery network may be simply modified by replacing the multipliers and dividers by synchronous oscillators to provide the various frequency multiplication and division functions. The prior art carrier recovery network may be further simplified by providing a synchronous oscillator to perform the carrier frequency tracking functions as well as any necessary multiplication and division functions. The carrier recovery network can still be further simplified to the point where a highly reliable carrier recovery network in accordance with the preferred embodiment of the present invention comprises a multiplier to provide requisite data removal, a bandpass filter receiving the output of the multiplier, and a dividing synchronous oscillator receiving the output of the bandpass filter to provide both the carrier frequency tracking and frequency division functions to provide a highly accurate carrier signal.

BRIEF DESCRIPTION OF THE DRAWINGS

FIGS. 3 through 6 are illustrations of the input and output wave forms associated with the synchronous oscillator acting to provide frequency multiplication and division functions;

FIG. 7 is a block diagram of a first embodiment of a QPSK carrier recovery network in accordance with the present invention;

FIG. 8 is an illustration of the waveforms associated with the data removal portion of the carrier recovery network of FIGS. 7 and 9;

DETAILED DESCRIPTION OF THE INVENTION

Figure 2:
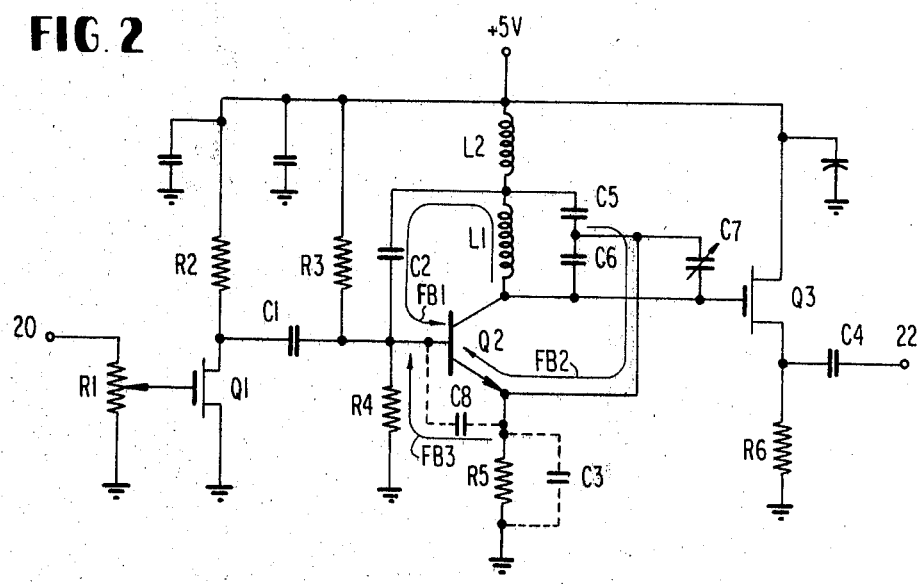
FIG. 2 is a schematic illustration of the synchronous oscillator in accordance with the present invention.

The synchronous oscillator in accordance with the present invention is illustrated in FIG. 2. The input signal is applied to input port 20 and is delivered to MOSFET Q1 through potentiometer R1. The output of MOSFET Q1 is delivered on the one hand to resistor R2 and on the other hand to transistor Q2 through capicator C1. The base of transistor Q2 is also connected to +5 volt supply through resistor R3, the connection between inductors L1 and L2 through capacitor C2, and to ground through resistor R4. The collector of transistor Q2 is applied to +5 volt supply through inductors L1 and L2, the node between the inductors also being coupled to the collector through capacitor C5 and C6. The output of the emitter of transistor Q2 is applied to the node between capacitors C5 and C6 on the one hand and to ground through resistor R5 and optional shunt capacitor C3, on the other hand. The emitter of transistor Q2 is further tied to the collector through adjustable capacitor C7 and to the base through optional capacitor C8. The collector of transistor Q2 is applied to the gate of MOSFET Q3, the source of which is tied to the +5 volt supply, the drain of which is applied to the output port 22 through capacitor C4, and to ground through resistor R6.

The synchronous oscillator of FIG. 2 is a free-running oscillator, oscillating at its natural frequency of $\omega_o$, as long as there is no external signal. As soon as an external signal, or control signal sometimes referred to as the injected input signal, of frequency $\omega$ in the vicinity of frequency $\omega_o$ is applied, the synchronous oscillator starts tracking the external frequency. Thus, the output frequency is sychronized to the external frequency and a phase difference exists between the input and output depending on the initial frequency difference between its free mode oscillation and the external frequency. The external signal to the synchronous oscillator can be sinusoidal, pulsed or some other waveform. As soon as the external signal is applied the frequencies of the external signal and the free-running oscillator begin to approach each other to produce "frequency pull-in", and after a very short time the oscillator settles to a steady state oscillation synchronous with the external signal and with a phase angle difference proportional to the original difference between the external signal and the free-running oscillator frequencies.

In general, the lock-in range, the pull-in range and a synchronization performance in general depend upon the Q of the oscillator tuned circuit, the amount of positive feedback to Q2, the amplitude and wave shape of the external signal, and the gain characteristics of transistor Q2. The amount of positive feedback is especially important when the system requires a "memory" since the synchronous oscillator has the ability to sustain oscillations at the frequency of the external signal even if the external signal ceases to appear for prolonged periods of time. As many communication systems require absolute frequency tracking and only relative phase tracking, synchronous oscillators can be used in coherent communications systems. The synchronous oscillator in accordance with the present invention has been used successfully in carrier recovery systems in both the continuous and burst modes. Furthermore, a relatively small external IF signal of 500 mV can produce a synchronized output of 10 V which corresponds to a power gain of 400.

The positive feedback is provided through two or three feedback loops as identified in FIG. 2 by FB1, FB2 and FB3. FB1 is a feedback loop from the collector of transistor Q2, through inductor L1 and capacitor C2 to the base of Q2. Feedback loop FB2 applies a voltage between capacitors C5 and C6 to the emitter of Q2 to effect a change in the base current of Q2. A third feedback path FB3 is provided by capacitor C8 which directly bridges the emitter in base of transistor Q2. The third feedback loop FB3 is optional and functions to increase the bandwidth of the synchronous oscillator and lower the Q, thereby provide a wide tracking range. The emitter leg resistor R5 and optional capacitor C3 affect the three feedback paths by providing negative feedback to the base input of transistor Q2 while at the same time providing positive feedback for feedback path FB2.

In burst mode operation, the synchronous oscillator is especially effective and useful. When the burst signal appears at the input of the synchronous oscillator, the lock-in frequency occurs almost immediately and the phase adjusts itself gradually.

The analysis of the synchronous oscillator given in full detail below, reveals that it constitutes a first order servo loop, which can replace in many cases existing first order phase-lock loops or tracking systems. See C. L. Ruthroff, "Injection-Locked Oscillator FM Receiver Analysis", *BSTJ*, October 1968, pages 1653–1661. As gain and bandwidth can be adjusted independently from each other to a great extent, a synchronous oscillator can operate at much higher frequencies and with shorter acquisition times compared to phase lock loops. Since the control signal to the VCO in a phase lock loop is derived indirectly through a phase detector, the acquisition time is increased, and errors due to the non-linearity of the phase detector may be introduced into the system.

Although there are several theories as to the operation and synchronization of a synchronous oscillator, it appears that the introduction of varying amounts of incremental negative resistance by the external signal constitutes the main factor in the synchronization process. When the oscillator is locked to the external signal, it acts as a negative conductance, which forces power to flow to the oscillator. If the external frequency changes, the negative conductance introduced into the oscillator changes in conjunction with non-linearities in the oscillator which in turn varies the frequency of oscillation of the synchronous oscillator by establishing a new stable operating point.

There are several important features which make the synchronous oscillator very useful. See R. Adler, "A Study of Locking Phenomena in Oscillators", *Proc. of the IRE*, June 1946, pp. 351–357 and L. J. Paciorek, "Injection Locking of Oscillators", *Proc. IEEE, Novem-* ber 1965, pp. 1723-1727. Although there have been numerous mathematical analyses of synchronous oscillators in the literature none tries to analyze its physical behavior and the principles which make synchronization possible. A synchronous oscillator can be considered a tracking network where the external signal forces its own frequency of oscillation, as a regenerative or parametric amplifier. In all cases an incremental negative resistance is definitely established by the external signal to create net zero resistance for each external frequency. From the theory of oscillations, it is known that the incremental negative resistance achieved by feedback and non-linearity should cancel all losses in the network. The properties of the external signal is to increase this incremental negative resistance, acting as an energy source to the free running oscillator, and establish a new steady state synchronization condition.

An important feature in the operation of a synchronous oscillator is its tracking range versus input power and its associated phase difference between the external signal and output signal. The test results for a 70 MHz synchronous oscillator are given in Table 1, and confirm the mathematical analysis. (See equation 27 below).

TABLE 1

| Tracking Range vs. Input Power | | | |
|---|---|---|---|
| Input Power | Center Frequency | Phase Error | Tracking Range |
| (dBm) | (MHz) | (degrees) | (kHz) |
| −20 | 70 | +2 | +20 |
| −10 | 70 | +2 | +45 |
| 0 | 70 | +2 | +140 |
| +10 | 70 | +2 | ±520 |

In many applications such as in a carrier recovery network (CRN), the phase shift of the recovered carrier should be minimized for a given change in the IF frequency. This necessitates high loop gains in phase-lock loops, which means higher noise levels and instability. The synchronous oscillator has the distinct advantage in this respect as seen in Table 1. The phase error can be kept around ±2 for a large range of frequency variations provided the external signal is kept within a required range.

Furthermore, since the tracking range of the synchronous oscillator is a function of the external signal, the circuit can adapt to external conditions. When the IF signal level drops, the bandwidth of the synchronous oscillator is reduced, and as a result, the S/N remains almost constant. Thus, in the situation where an earth station communicates with a satellite, atmospheric interference such as a thunderstorm between the earth station and satellite will not necessarily cause a degradation of S/N since the attenuated signal level will produce a corresponding reduction in the system bandwidth, which in turn minimizes noise.

The overall Q of the synchronous oscillator, which determines the pull-in and track-in range of the oscillator, is determined by the following parameters: (1) the amplitude of the external signal, (2) the spectral energy content of the external signal, (3) the current gain of the oscillator transistor Q2, and (4) the Q of the tuned feedback circuit. Thus, the pull-in and track-in range of the synchronous oscillator can be adjusted by adjusting the amplitude of the input signal at potentiometer R1 and MOSFET Q1, by changing the current gain of transistor Q2 and by changing the values of inductors L1, L2 and capacitors C2, C5 and C6. The Q of the oscillator can also be lowered by providing the optional capacitor C8, as mentioned above. The pull-in and track-in range of the synchronous oscillator can further be adjusted by adjusting the spectral energy content of the external signal. This may be accomplished by providing a pulse forming network at the input 20 of the synchronous oscillator. By adjusting the amplitude of the pulses and the pulse width, the energy content of the external signal may be varied. As to the current gain of transistor Q2, the higher the current gain, the lower the track-in range becomes as can be seen from equation 28, below. Note that the feedback voltage $E_\beta$ in equation 28 is proportional to the output voltage $E_\beta$. Therefore, the injected input voltage $E_1$ and $E_\beta$ have an inverse effect on the tracking range.

The synchronous oscillator can also be used as a highly linear multiplier or divider. Separate synchronous oscillators were tested for their tracking range with the input at the second and fourth harmonics of the oscillator in order to provide a divide function. The results are given in Table 2. No phase shift measurements are shown for either case due to frequency transformation between the input and the output of the synchronous oscillator.

TABLE 2

| | Tracking Range with Harmonics | | |
|---|---|---|---|
| Input Power | Input Frequency Range | Output Frequency Range | Tracking Range |
| 20 dBm | 143.8–138.12 | 71.90–69.06 | 2.84 MHz |
| 18 dBm | 277.20–283.88 | 69.30–70.97 | 1.33 MHz |

For the fourth harmonic test the input power level has been reduced to 18 dBm because of the input coupling effects. But, in all cases, the tracking range is reduced as harmonic levels are increased.

FIG. 3 is an illustration of the waveforms produced at various portions of the synchronous oscillator having a second harmonic applied to the input port 20 to provide a divide-by-two function. The second harmonic sinusoidal input to port 20 is shown as curve 3A. The tuned circuit is tuned to a frequency approximately one-half that of the input frequency. The output waveform is illustrated in FIG. 3C and is at one-half the frequency of the input. The input to the base of transistor Q2 is illustrated at 3B where the output waveform 3C and input wave form 3A are superimposed.

FIG. 4 illustrates the use of the synchronous oscillator as a divide-by-four circuit. The fourth harmonic of the tuned frequency of the synchronous oscillator is applied to input port 20 and is shown at 4A. The output of the synchronous oscillator at port 22 is illustrated at 4C. The input to the base of transistor Q2 is illustrated at 4B and has the output wave form 4C and the input wave form 4A superimposed thereon. The output wave form 4C distinctly shows the points of synchronization with the input wave form. Even in the case of non-symmetrical synchronization, where the input carrier is not exactly four times the synchronous oscillator natural frequency, the synchronization or division by four is still maintained. At the points of synchronization, the output waveform 4C is slightly distorted but can be eliminated by applying narrow pulses at the input frequency of the fourth harmonic to thereby adjust the energy content of the external signal to effect a change in the overall Q of the synchronous oscillator. Another method of eliminating this distortion in the divide-by-four network would be to use two divide-by-two synchronous oscillators in cascade. As illustrated in FIG. 3, the divide by two network causes distortion at the base of transistor Q2 but the output remains substantially undistorted.

Similarly, the synchronous oscillator can be synchronized to sub-harmonics in order to provide a multiply function. FIG. 5 is an illustration of the waveforms at various portions of the synchronous oscillator which is tuned to the second harmonic of the input frequency. The input frequency to port 20 is illustrated at 5A and the output of the synchronous oscillator at port 22 is illustrated at 5C, and is at twice the frequency of the input signal. The input to the transistor Q2 has the output waveform and the input waveform superimposed thereon.

FIG. 6 illustrates a synchronous oscillator tuned to the fourth harmonic of the input frequency. The input to port 20, 6A, is multiplied by 4 and is output at port 22, 6C, as shown. The input to the base of transistor Q2 has the output waveform 6C and the input waveform 6a superimposed thereon. The direct multiplication by 4 produces an output waveform 6C having amplitude variations. In the case illustrated in FIG. 6, where a 54 MHz input 6A is multiplied to 216 MHz signal, the lower sideband (the difference between the upper and lower frequencies) is −22 dB with respect to the multiplied output frequency, whereas the upper sideband (sum of the upper and lower frequencies) is −18 dB. If two multiply-by-two multipliers are used in cascade, the amplitude variations substantially disappear and the sidebands are reduced to approximately −26 dB.

The harmonics generated by the synchronous oscillator are at least 3 dB lower than those produced a diode multiplier and thus approach linear operation in comparison with the non-linear diode multiplier. The linear operation is due to the fact that sensitivity and selectivity of a synchronous oscillator can be adjusted independently to a great extent. Furthermore, presently available dividers are limited by the state of the art of the solid state counters which do not exceed a few hundred MHz, whereas frequencies in the GHz range can easily be divided with microwave synchronous oscillators.

Another important feature of the synchronous oscillator is its ability to store the external frequency for a few seconds when the external signal is removed. This is especially useful in clock recovery networks, when the synchronization signal is removed periodically. In spite of this the synchronous oscillator continues to ocsillate at the same frequency as the external signal until time constants of the circuit take over, due to the high positive feedback associated with the synchronous oscillator which keeps feeding back the original signal frequency of the external source.

Figure 1:
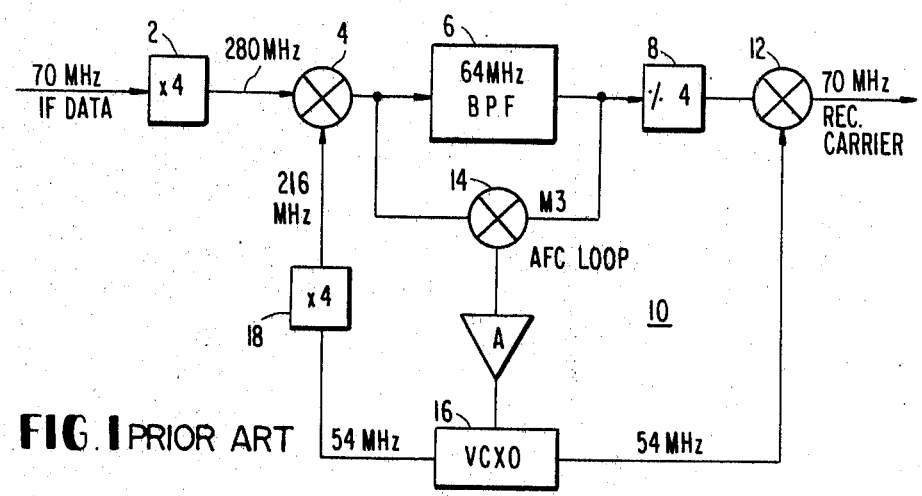
FIG. 1 is a block diagram of a prior art QPSK carrier recovery network.

The prior art carrier recovery network of FIG. 1 does not function adequately when low bit rates are employed. The 64 MHz band pass filter imposes problems due to its wide bandwidth, whereas lowering the bandwidth limits the acquisition speed of the modem in burst mode operation. Conversely, at high bit rates the acquisition speed, noise and tracking range must be compromised, in which case critical design requirements must be imposed on the active low pass filter which drives the VCXO. Additional design factors must therefore be added to the present carrier recovery network to compensate for these deficiencies which increase the cost and complexity of the network.

It can be readily seen that the synchronous oscillator in accordance with the present invention can replace the multiplier 18 and the divider 8, FIG. 1, with synchronous oscillators operating as multiply and divide-by-four circuits, 24 and 26, FIG. 7, respectively. The 64 MHz, 200 Hz bandwidth bandpass filter 6, FIG. 1, is replaced by a surface acoustic wave (SAW) filter 28, as shown in FIG. 7. The typical bandpass filter 6 employed in FIG. 1 is presently phase linear with 6 dB/octave slopes on either side of the center frequency. This frequency response is not sufficient to reduce the noise within the required limits. The SAW filter has a linear phase with group delay variations of not more than 10 nanoseconds within the bandpass and has a roll-off of better than 50 dB/octave. Finally the nonlinear multiplication by four at multiplier 2, FIG. 1, to remove the four-phase modulation (QPSK) is replaced by a multiply-by-two nonlinear multiplication at multiplier 30, followed by an absolute amplifier 32 and a third synchronous oscillator 34 tuned to 280 Mhz. The waveforms produced by the multiply-by-two circuit and the absolute amplifier are illustrated in FIG. 8. The QPSK data modulation on the IF carrier produces 90° phase shifts of the carrier signal. A multiplication by two of the modulated IF carrier produces the wave illustrated at FIG. 8A, where the 90° phase shifts have been transformed to 180° phase shifts. The prior art circuit of FIG. 1 completely removes the data modulation by multiplying the carrier by four to produce the wave form illustrated in FIG. 4B. Since the frequency of $2 \times IF$ has data modulated thereon at 180°, an absolute amplifier can be employed to simply shift all of the negative portions of the carrier wave to a positive level, thereby effectively producing a signal at the frequency $4 \times IF$ as shown at FIG. 8C. Thus, the multiply-by-two circuit 30 and the absolute amplifier 32, FIG. 7, may be used in lieu of the nonlinear multiply-by-four circuit 2, FIG. 1. The synchronous oscillator 32 is employed to provide a sinusoidal signal at 280 MHz to mixer 4.

Figure 9:
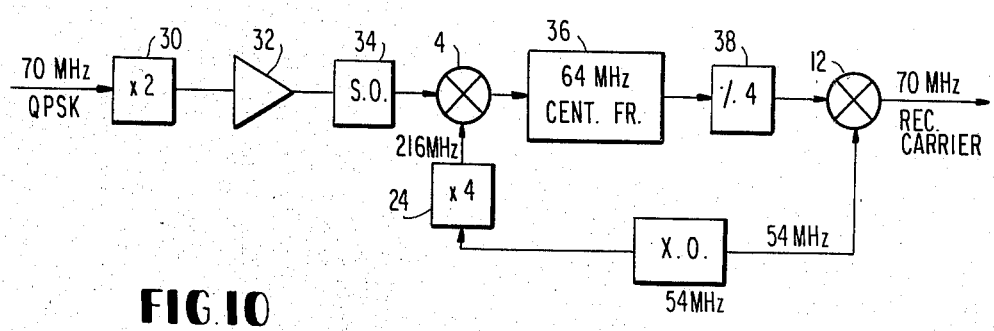
FIG. 9 is a block diagram of a second embodiment of a carrier recovery network in accordance with the present invention.

The inner AFC loop of the carrier recovery network of FIG. 7 is inherently nonlinear. That is, the output of the VCXO is not proportional to the input frequency variations. Thus, the resultant frequency applied to mixer 4 is not exactly 64 MHz. The mixer 14 and the associated amplifier can be removed if the 64 MHz bandpass or SAW filter is replaced with a variable center frequency bandpass filter. The synchronous oscillator in accordance with the present invention can be used for such purpose. The carrier recovery network designed in accordance with the foregoing is illustrated in FIG. 9. The 70 MHz QPSK IF carrier is delivered to mixer 4 via nonlinear multiplier 30 and absolute amplifier 32. The lower sideband of the mixer 4 is delivered to a synchronous oscillator tuned to 64 MHz. The output of the synchronous oscillator 36 is applied to divide-by-four synchronous oscillator 38, the output of which is delivered to mixer 12. The synchronous oscillator 36 automatically performs the function of the AFC loop 10, FIG. 1, to remove the carrier drift, since the input frequency will automatically be synchronized to the frequency delivered to divide by four synchronous oscillator 38.

Figure 10:
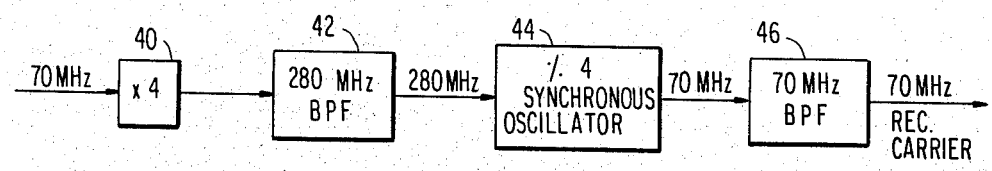
FIG. 10 is the preferred embodiment of the carrier recovery network in accordance with the present invention.

With this in mind it can be seen that the carrier recovery network can be further simplified to the preferred embodiment of the recovery network shown in FIG. 10. The 70 MHz QPSK is multiplied by four in multiplier 40 and delivered to a 280 MHz bandpass filter approximately 1 MHz in bandwidth. The 280 MHz signal is applied to a synchronous oscillator 44 which is tuned to 70 MHz to thereby function as a divide-by-four synchronous circuit. The signal from the synchronous oscillator 44 may further be applied to 70 MHz bandpass filter 46 to provide the 70 MHz recovered carrier but the filter 46 is not necessary for most applications.

The circuit constructed in accordance with FIG. 10 utilizes many of the advantages inherent in the synchronous oscillator of FIG. 2. The FIG. 10 carrier recovery network is fully synchronous and therefor follows any carrier drift. The synchronous oscillator also provides the divide-by-four function which is necessary to compensate for the modulation removal at multiplier 40. The synchronous oscillator 44 further provides a tracking filter ability having a variable bandwidth and as high a Q as necessary. The recovery network can automatically adjust the system bandwidth so as to maintain a constant signal-to-noise ratio which in turn allows system operation over a wide variety of environmental operating conditions. The synchronous oscillator 44 also provides any necessary amplification since the gain and bandwidth of the oscillator can be adjusted independently from each other to a great extent. Lastly, automatic gain control requirements are less demanding with the synchronous oscillator 44 since any amplitide variations to the input of the oscillator only effect the tracking range bandwidth, the output of the amplifier remaining substantially constant. Thus, the carrier recovery network in accordance with the present invention is greatly simplified in construction and substantially more reliable in operation than the prior art carrier recovery network of FIG. 1.

The short term frequency stability of the synchronous oscillator as a free running oscillator has been tested at five second intervals for thirty minutes after an initial stabilization of sixty minutes. The maximum frequency deviation within this period was found to be 3730 Hz.

The values of the components shown in the synchronous oscillator circuit 32 may be designed and selected in accordance with generally well known oscillator design criteria and the following analysis and test results for the synchronous oscillator provided in accordance with the present invention. Approximate component values for the synchronous oscillator 44 provided in accordance with the preferred embodiment of the present invention, FIG. 10, are given below in Table 3:

TABLE 3

| | |
|---|---|
| Q1 | = 3N154 |
| Q2 | = MPS6515 |
| Q3 | = SD2Q1 |
| R1 | = 2K Ω |
| R2 | = 360 Ω |
| R3 | = 75K Ω |
| R4 | = 100K–180K Ω |
| R5 | = 360 Ω |
| R6 | = 120 Ω |
| C1 | = 100pF |
| C2 | = 100pF |
| C3 | — 10pF |
| C4 | = 100pF |
| C5 | = C6 = 27pF |
| C7 | = 0–16pF |
| C8 | = 100pF |
| L1 | = 1μH |
| L2 | = 6.8μH |

In general, the $\beta$ of Q2 should be greater than 100 and the amount of positive feedback through capacitor C2, FB1, should be high.

Although the synchronous oscillator in accordance with the present invention is described specifically in terms of the construction of FIG. 2, many modifications to the circuit can be made to meet particular operational capabilities. For example, at oscillator frequencies over 100 MHz, the short term stability of the synchronous oscillator may become excessive if the modems have to operate at extreme temperatures and are unattended for long periods of time. For this purpose the overall Q of the synchronous oscillator must be increased to 1000 and higher. In this case the feedback capacitor C2 in FIG. 2 is replaced with SAW device used as a 360° delay element. Such a SAW is effective in constraining the feedback only to frequencies within the tracking range of the modem. Q's of several thousand and over can be achieved with SAW delay elements without limiting the necessary tracking range of the oscillator. See H. G. Vollers, and L. T. Claiborne, "RF Oscillator Control Utilizing Surface Wave Delay Lines", *Proc. 28th Annual Symp. on Frequency Control*, 1974, pp. 256–259, and T. E. Parker, "I/f Phase Noise in Quartz SAW Devices", *Electron Lett.* 15, 1979, pp. 296–1979.

It should be noted that the analysis of the synchronous oscillator, below, is performed for a feedback voltage in general. It can therefore be seen by one skilled in the art that a very wide variety of synchronous oscillators can be designed in accordance with the following analysis to provide any number of operational characteristics.

It must also be realized that the synchronous oscillator can be utilized in many other areas such as FM modulation and demodulation, multi-frequency transmission where many harmonics and subharmonics are generated from a single stable frequency source, and in FSK and MSK modems. Since the sensitivity, which is a function of the $\beta$ of Q2, and the selectivity, which is a function of input amplitude and circuit Q of a synchronous oscillator can be adjusted to almost any practical level with substantial independence, it can perform its tracking and pulling under lower signal-to-noise ratio conditions than phase-locked loops.

Figure 11:
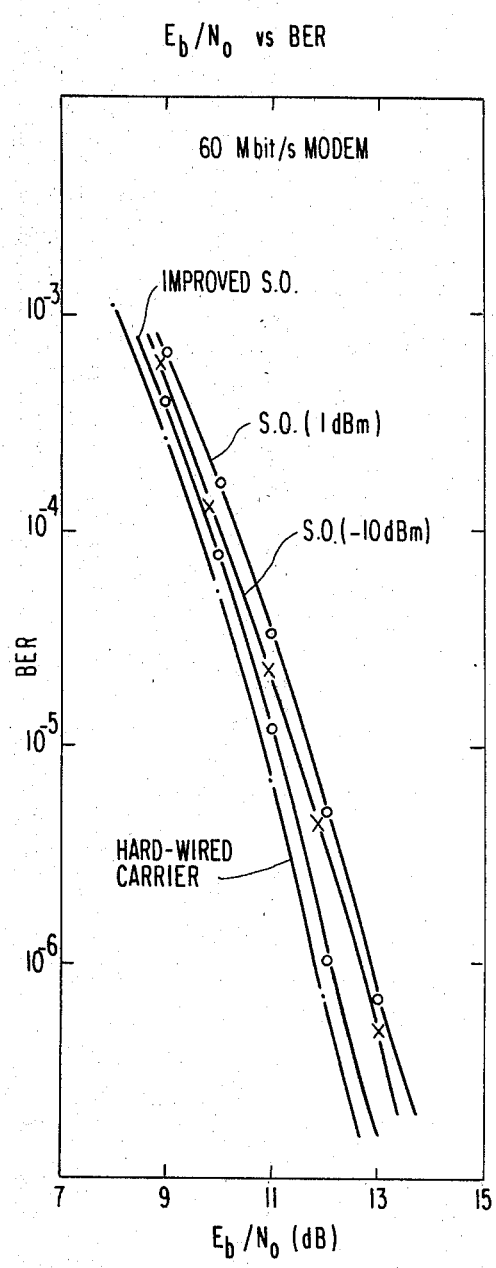
FIGS. 11 and 12 are graphs illustrating the bit error rate as a function of signal-to-noise ratio using the car

Experimental results performed on a 60 M bit/S modem in combination with the carrier recovery systems of FIG. 10 (the output filter 46 being optional) are shown in FIG. 11. The initial results obtained are competitive, and in many cases, superior results achievable with presently available carrier recovery networks.

FIG. 11 shows bit-error-rate (BER) versus signal-to-noise ratio for two input levels, 1 and −10dBm. The reduced input improves the BER due to a narrower bandwidth of the synchronous oscillator. The third curve, which is only 0.2 dB off from the hardwired case, is with an improved synchronous oscillator. The improvement in the operation of the synchronous oscillator is achieved by replacing the transistor Q2 with another of the same type, but of lower $\beta$. Also, the emitter leg resistor R5, typically of carbon construction, was replaced with a wire wound resistor.

Figure 12:
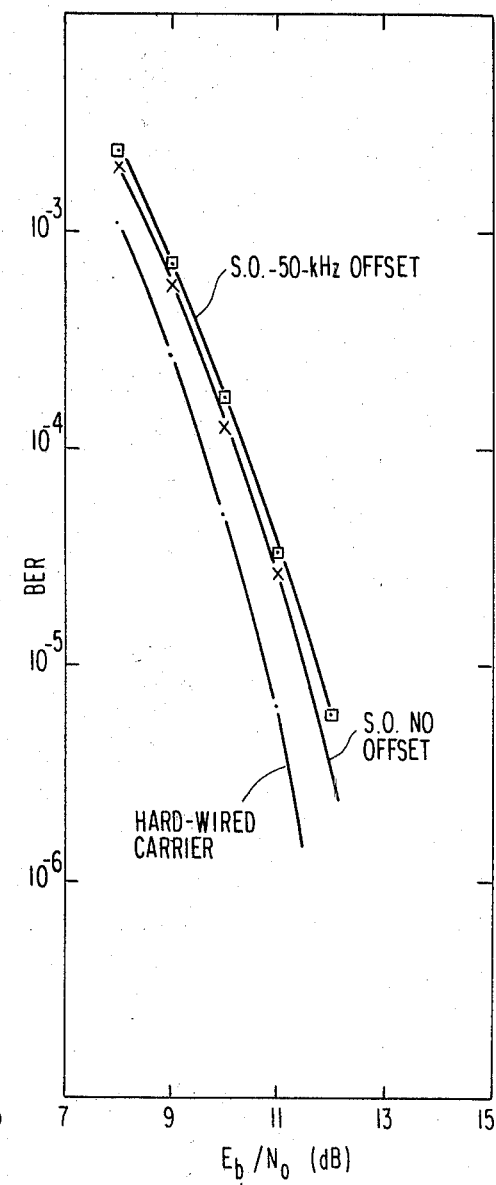
Figure 13:
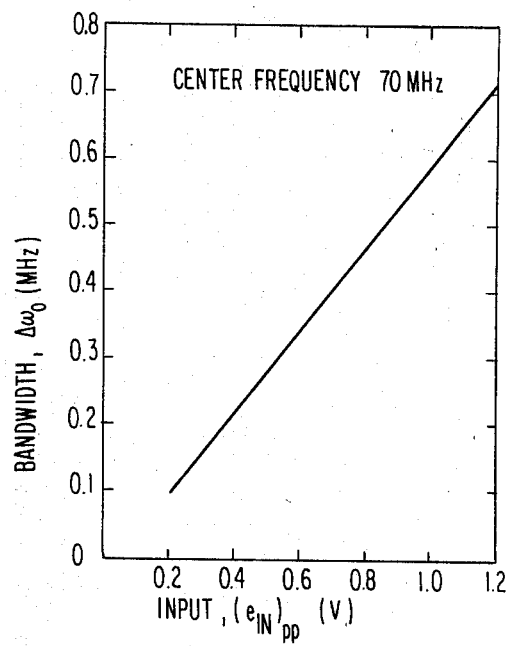
- FIG. 13 is a graph illustrating the bandwidth of the synchronous oscillator as a function of input level.

FIG. 12 shows the BER versus signal-to-noise ratio where the IF frequency is offset by −50 kHz. There is only a difference of 0.2 dB between this curve and the curve with no frequency offset. This error is assumed to be due to the initial tuning of the oscillator, which had an offset of few kHz. At +50 kHz IF variation, no change in the BER curve can be observed. These results are superior to the results obtained with standard carrier recovery units.

Carrier recovery in burst mode has been compared for hardwired and synchronous oscillator operation. The synchronous oscillator recovery occurs around 500 ns. Although this figure satisfies most of the present requirements, improvements to recovery time can be expected with minor variations to the network.

FIG. 14 shows the bandwidth variation or tracking range of the synchronous oscillator with drive level as measured by a network analyzer. It has also been found that the phase variations between input and output within the tracking ranges do not vary more than 2°. The bandwidth is a linear function of the drive level. This characteristic enables the synchronous oscillator to adjust its bandwidth automatically with the carrier input level, and minimizes the requirements for an AGG by keeping output carrier level constant. Moreover, the synchronous oscillator is insensitive to small external signal variations between adjacent bursts.

ANALYSIS OF A GENERALIZED SYNCHRONOUS OSCILLATOR

Figure 14A:
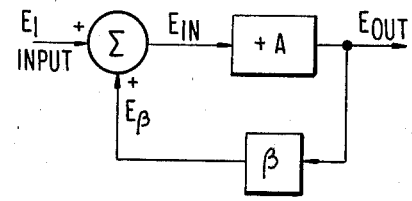
FIG. 14a is a functional representation of the synchronous oscillator in accordance with the present invention.
Figure 14B:
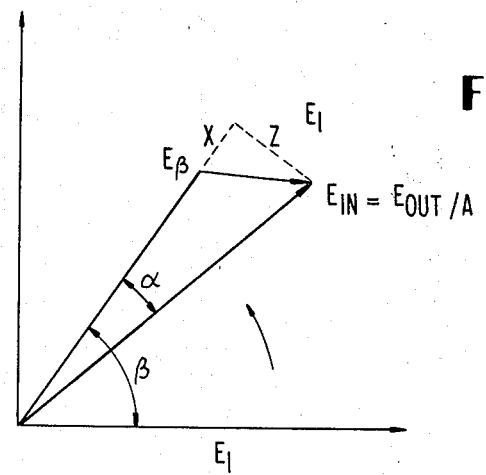
FIG. 14b is a phasor representation of the synchronous oscillator in accordance with the present invention.

For analytical purposes, FIG. 2 has been reduced to the equivalent circuit shown in FIG. 14A. The $\beta$-network comprises all of the positive feedbacks identified in FIG. 2. In FIG. 14A and 14B, $E_I$ is the injected input voltage, $E_\beta$ the feedback voltage, and $E_{in}$ the resultant voltage to the input of the amplifier. Also, $\beta$ is the phase difference at a given time between the feedback voltage and the input voltage to the amplifier, and $\alpha$ is the phase difference between the feedback voltage and the output voltage, or $Ae_{in}$. It is assumed that $E_I$ is constant and fixed in phase, and it is used as a reference vector.

From FIG. 14B, and from Adler and Paciozek, above, $$\tan \alpha = -Z/(E_\beta + X) \tag{1}$$

$$\sin \beta = Z/E_I \tag{2}$$

$$\cos \beta = X/E_I \tag{3}$$

Substituting equations (2) and (3) into (1) results in $$\tan \alpha = E_I \sin \beta/(E_\beta + E_I \cos \beta) \tag{4}$$

For small $\alpha$, $$\tan \alpha \to \alpha$$

and $$E_I \cos \beta << E_\beta$$

as $E_I$ becomes very small. Thus, (4) becomes $$\alpha = -E_I \sin\beta/E_\beta. \tag{5}$$

Figure 15:
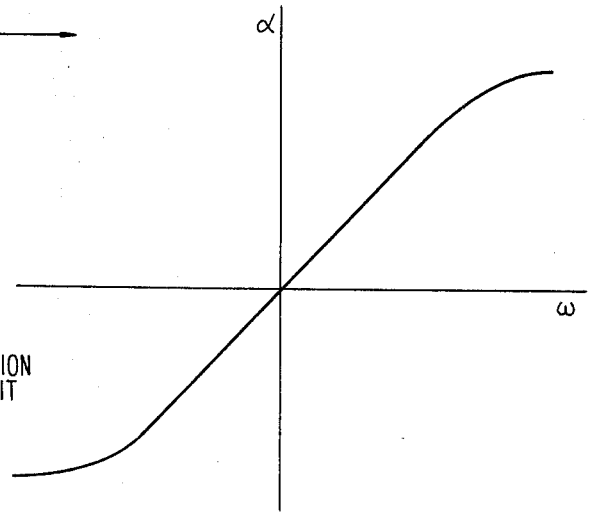
FIG. 15 is a graph illustrating the relationship of phase as a function of frequency variation for a simple tuned circuit.

For a single tuned circuit the phase versus frequency variation is give in FIG. 15. Operating around the center in a linear region one can write $$K = d\alpha/d\omega \tag{6}$$

Integrating equation (6), one has $$\int_{\omega_O}^{\omega} K\, d\omega = \int_{0}^{\alpha} d\alpha \tag{7}$$

$$K(\omega - \omega_O) = \alpha, \tag{8}$$

where $\omega$ is the instantaneous frequency, and $\omega_O$ the natural frequency. Substituting equation (8) into (5) results in $$K(\omega - \omega_O) = -E_I \sin \beta/E_\beta. \tag{9}$$

Adding and subtracting input frequency $\omega_I$ from (9), one obtains $$K[(\omega - \omega_I) - (\omega_O - \omega_I)] = -E_I \sin\beta/E_\beta \tag{10}$$

or $$K[\Delta\omega - \Delta\omega_O] = -E_I \sin\beta/E_\beta. \tag{11}$$

As $$\Delta\omega = d\beta/dt,$$

equation (11) can be written as $$K(d\beta/dt) - \Delta\omega_O = -(E_I/E_\beta) \sin \beta. \tag{12}$$

Defining $$B = (1/K)(E_I/E_\beta), \tag{13}$$

equation (12) can be written as $$d\beta/dt = -B \sin \beta + \Delta\omega_O, \tag{14a}$$

or $$\Delta\omega = -B \sin \beta + \Delta\omega_O, \tag{14b}$$

which is a nonlinear differential equation. Adding the input frequency on both sides of expression (14b)

$$\Delta\omega + \omega_I = -B \sin \beta + \Delta\omega_O + \omega_I \tag{15}$$

results in $$\omega = -B \sin \beta + \omega_O, \tag{16}$$

or $$\omega - \omega_O = -B \sin \beta. \tag{17}$$

For a single tuned circuit one can write $$\tan \alpha = 2Q(\omega - \omega_O)/\omega_O. \tag{18}$$

For a small $\alpha$, equation (18) becomes $$\alpha = 2Q(\omega - \omega_O)/\omega_O. \tag{19}$$

From expression (18)

$$2Q(\omega - \omega_O)/\omega_O = K(\omega - \omega_O), \tag{20}$$

or $$2Q/\omega_O = K, \tag{21}$$

as $$B = (1/K)(E_I/E_\beta).$$

Equation (21) can be written as $$2Q/\omega_O = (1/B)(E_1/E_\beta), \tag{22}$$

or $$B = (E_1/E_\beta)(\omega_0/2Q) \tag{23}$$

One can write (14a) as $$d\beta/dt = (-\omega_0/2Q)(E_1/E_\beta)\sin\beta + \Delta\omega_0. \tag{24}$$

For steady state, $$d\beta/dt = 0. \tag{25}$$

Thus, one can write $$\sin\beta = -(2QE_{62}/E_1)(\Delta\omega_0/\omega_0). \tag{26}$$

This gives the stationary phase angle between the feedback voltage of the oscillator and the input signal. Since $\sin\beta$ can only assume values between $+1$ and $-1$, no steady state is possible if the right side of equation (26) is outside this range. This gives the condition for synchronization $$2Q(E_\beta/E_1)(\Delta\omega_0/\omega_0) < 1, \tag{27}$$

or $$E_1/E_\beta > 2Q(\Delta\omega_0/\omega_0). \tag{28}$$

The experimental results for expression (28) are given in FIG. 14 which shows tracking $BW = \Delta\omega_0$ versus input $= E_1$.

PULL-IN CONDITION

In equation (24) $\Delta\omega_0$ was set to 0. This means that the input frequency is equal to the oscillator frequency and locking will occur eventually. The expression $$d\beta/dt \approx -B\sin\beta \tag{29}$$

shows what happens when the input signal $E_1$ is suddenly switched on with an initial lag $\beta_1$ behind the free running oscillator. Equation (29) is almost equal to $$d\beta/dt = -B\cdot\beta, \tag{30}$$

when $\beta$ is small.

Expression (30) has the familiar solution $$\beta = \beta_1 e^{-Bt}. \tag{31}$$

In Laplace transform (31) becomes $$\beta(s) = \beta_1/(s+B). \tag{32}$$

Physically this means that the oscillator phase sinks towards that of the input signal, first approximately, then accurately as a capacitive discharge into resistor. The speed of this process according to (23) which defines B, is proportional to the ratio of input voltage to oscillator feedback voltage and to the bandwidth of the tuned circuit. If the free running frequency is not equal to that of the input frequency, but close enough to permit locking according to expression (28), the manner in which the steady state is reached must still resemble a capacitive discharge. If the input frequency is suddenly terminated, the return of the oscillator to its free running frequency will require some time, as $E_\beta = E_{in}$ due to high feedback and the system remains in a stable condition. External effects and noise will eventually force the oscillator to return to its free running mode. This can be considered as a hysterisis in the oscillator which makes it continue oscillating in its present mode even if the external synchronization signal is turned off.

TRANSFER FUNCTIONS

In Laplace transform, (24) can be written as $$s\beta(s) = (-\omega_0/2Q)(E_1/E_\beta)\beta(s) + (\Delta\omega_0/s), \tag{33}$$

where for small $\beta$ $$\sin\beta \to \beta.$$

Rearranging (33), $$\beta(s)\left[s + \frac{\omega_0}{2Q}\frac{E_1}{E_\beta}\right] = \frac{\Delta\omega_0}{s}, \tag{34a}$$

$$\beta(s) = \frac{\Delta\omega_0}{s\left[s + \frac{\omega_0}{2Q}\frac{E_1}{E_\beta}\right]}. \tag{34b}$$

Output phase change versus input frequency variations can be written as $$\frac{\beta(s)}{\Delta\omega_0} = \frac{1}{s\left[s + \frac{\omega_0}{2Q}\frac{E_1}{E_\beta}\right]}. \tag{35}$$

Expression (35) shows that it is a first order servo loop with one pole at the origin. If interest lies in the output frequency variations, one can write $$\Delta\omega = dQ/dt = d\beta(s)/dt \tag{36}$$

$$d\beta(s)/dt = s\beta(s). \tag{37}$$

Therefore, $$\frac{d\beta(s)}{dt} = s\beta(s) = \frac{\Delta\omega_0}{s + \frac{\omega_0}{2Q}\frac{E_1}{E_\beta}}. \tag{38}$$

Expression (24) is a nonlinear differential equation. Expressions (34), (35) and (38) are solutions of expression (24) for a linearized case.

| SUMMARY OF EQUATIONS | |
|---|---|
| $\sin\beta = \dfrac{2QE_\beta}{E_1}\dfrac{\Delta\omega_0}{\omega_0}$ | Steady state phase angle between the feedback voltage and the input voltage. |
| $\dfrac{E_1}{E_\beta} > 2Q\dfrac{\Delta\omega_0}{\omega_0}$ | Condition for synchronization. Also, tracking range $= \Delta\omega_0$, which is proportional to input $E_1$, and inversely proportional to the gain of the oscillator. |
| $\beta = \beta_1 e^{-Bt}$ | Phase variation when $E_1$ is suddenly applied to the SO. |
| $\dfrac{\beta(s)}{\Delta\omega_0} = \dfrac{1}{s\left[s + \dfrac{\omega_0}{2Q}\dfrac{E_1}{E_\beta}\right]}$ | Phase variation with respect change in frequency. |

Various changes additions an omissions of elements may be made within the spirit and scope of the invention. It is to be understood that the invention is not limited to the specific details and examples described herein.

I claim:

1. A carrier recovery network for recovering a pure carrier waveform from a received carrier waveform having information modulated thereon, said carrier recovery network comprising:

first processing means for processing said received carrier waveform according to a first function in order to remove said information modulation therefrom to provide a processed output; and an oscillator having (a) an oscillator input receiving said processed output of said first processing means and (b) an oscillator output having said pure carrier waveform thereon, said oscillator having means for synchronizing a signal at said oscillator output with a signal at said oscillator input whereby frequency variations in said processed output produce frequency variations in said pure carrier waveform, said oscillator also having means for further processing said processed output according to a second function, said second function being the inverse of said first function, whereby said pure carrier waveform is a substantial replica of said received carrier waveform without said data modulated thereon.

2. The network of claim 1 wherein (i) said information is modulated using phase shift keying modulation having N discrete states, (ii) said first function is a multiplication by N, and (iii) said second function is a division by N.

3. The network of claim 1 wherein said modulation is quarternary phase shift keying, said first function is a multiplication by four, and said second function is a division by four.

4. The network of claim 1 wherein said modulation is binary phase shift keying, said first function is a multiplication by two, and said second function is a division by two.

5. The network of claim 1 wherein said frequency variations in said processed output are caused by carrier drift.

6. The network of claim 1 wherein said oscillator comprises a transistor having a collector, emitter and a base, said base receiving said processed output, and said means for synchronizing comprises a plurality of feedback paths each provided to apply a signal related to said signal at said oscillator output to said base of said transistor.

7. The network of claim 6 wherein one of said collector and emitter is connected to a supply voltage through a pair of inductors connected at a common node and a first feedback path is provided from said one of said collector and emitter, through one of said pair of inductors, and through a first capacitor to said base.

8. The network of claim 7 wherein said inductors are connected in series from said supply voltage to said one of said collector and emitter.

9. The network of claim 6 wherein one of said collector and emitter is connected to a supply voltage through a pair of capacitors and an inductor, and a second feedback path is provided from said one of said collector and emitter, through one of said pair of capacitors to the other of said collector and emitter.

10. The network of claim 9 wherein said pair of capacitors and said inductor are connected in series between said one of said collector and emitter and said supply voltage.

11. The network of claim 10 wherein said inductor is directly coupled to said supply voltage.

12. The network of claim 11 wherein said pair of capacitors are connected in parallel with a second inductor.

13. The network of claims 7 or 9 wherein the other of said collector and emitter is connected to said base through a second capacitor to provide a third feedback path from the other of said collector and emitter to said base.

14. The network of claim 7 further comprising second and third capacitors coupled to said one of said collector and emitter and said common node, whereby a second feedback path is established from said one of said collector and emitter to the other of said collector and emitter through said second capacitor.

15. The network of claim 1 wherein said oscillator comprises a transistor having a collector, emitter, and base, said base receiving said processed output; wherein said means for further processing said processed output according to a second function comprises tuned circuit means disposed between said transistor and a supply voltage, the characteristics of said tuned circuit means being chosen in accordance with said second function.

16. The network of claim 15 wherein said said tuned circuit means provides a resonant frequency in accordance with said second function.

17. The network of claim 16 wherein said resonant frequency is chosen to be approximately equal to a submultiple of the frequency of said processed output, said second function being a divide function.

18. The network of claim 17 wherein said tuned circuit means comprises a pair of inductors connected in series between one of said collector and emitter, first and second capacitors connected in series across said first inductor, and a third capacitor connected on one hand to a common node between said inductors and on the other hand to said base.

19. The network of claim 18 wherein said tuned circuit means further comprises a feedback path from a common node between said first and second capacitors to the other of said collector and emitter.

20. The network of claim 1 wherein said means for synchronizing and said means for further processing comprise:

a transistor having a collector, emitter and base, one of said collector and emitter coupled through inductive means and first capacitive means to a supply voltage, said base having said processed output applied thereto, said base further coupled to one of said collector and emitter through second capacitive means and said inductive means to provide a first feedback path, said one of said collector and emitter coupled to the other of said collector and emitter through said first capacitive means to provide a second feedback path.

21. The network of claim 20 wherein said inductive means comprises a pair of inductors connected in series, said first capacitive means comprises a pair of capacitors connected in series series between a node common to said pair of inductors and to said one of said emitter and collector, said second capacitive means comprises a single capacitor coupled between said node and said base, and said second feedback path is from a common connection of said pair of capacitors to the other of said emitter and collector.

22. The network of claim 1 further comprising a pulse network at the output of said first processing means and gain adjustment means at the output of said pulse network whereby said received carrier waveform is coupled to said oscillator through said pulse network and said gain adjustment means, whereby said pulse network and gain adjustment may be used to provide a signal having a selected spectral energy content at said oscillator input.

23. A network for extracting a pure carrier wave from a received carrier wave having information modulated thereon, said network having synchronous oscillator means comprising:
   amplification means having first and second main electrodes and a control electrode, said control electrode receiving oscillator input signals, said first main electrode connected (i) to a supply voltage through first reactive impedance means, (ii) to a second reactive impedance means having a reactance opposite the reactance of said first reactive impedance means through said first reactive impedance means, and (iii) to said control electrode through said first reactive impedance means and a third reactive impedance means having a reactance opposite said first reactive impedance means to provide a first feedback path, said first main electrode coupled to said second main electrode through said second reactive impedance means to provide a second feedback path; wherein said first, second and third reactive impedance means are adapted to allow said synchronous oscillator means to selectively provide at least one of (a) multiplying, (b) dividing, and (c) frequency synchronizing functions.

24. The network of claim 23 wherein said first reactive impedance means comprises first and second series connected inductors coupling said first main electrode to said supply voltage; said second reactive impedance means comprises first and second capacitors connected in series to said first main electrode and to a first node common to said first and second series connected inductors; said second feedback path being from a second node common to said first and second capacitors to said second main electrode; and said third reactive impedance means comprises a third capacitor connected to said first node and to said control electrode.

25. The network of claim 24 further comprising a fourth capacitor coupling said second main electrode to said control electrode to provide a third feedback path from said second main electrode to said control electrode.

26. A carrier recovery network for recovering a pure carrier waveform from a received carrier waveform having information modulated thereon, said carrier recovery network comprising:
   first processing means for processing said received carrier waveform according to a first function in order to remove said information modulation therefrom to provide a processed output;
   a first mixer receiving said processed output and a first local signal to provide a first mixed signal;
   a first oscillator for receiving and further processing said first mixed signal according to the inverse of said first function to provide a further processed output;
   a second mixer receiving said further processed output and a second local signal to provide said pure carrier waveform;
   a source oscillator for producing a signal at the frequency of said second local signal, said second local signal being received from said source oscillator; and
   a second oscillator for receiving and processing said signal at the frequency of said second local signal according to said first function to provide said first local signal.

27. A carrier recovery network for recovering a pure carrier waveform from a received carrier waveform having information modulated thereon, said carrier recovery network comprising:
   first processing means for processing said received carrier waveform according to a first function in order to remove said information modulation therefrom to provide a processed output;
   a first mixer receiving said processed output and a first local signal to provide a first mixed signal;
   means for determining frequency drift in said received carrier to provide a correction output and a carrier output;
   a first oscillator receiving said carrier output for further processing said carrier output according to the inverse of said first function to provide a further processed output;
   second mixer means receiving said further processed output and a second local signal to provide said pure carrier waveform;
   a voltage controlled oscillator receiving said correction output for providing an output signal at the frequency of said second local signal, said second local signal being derived therefrom; and
   a second oscillator receiving and processing said output signal of said voltage controlled oscillator according to said first function to provide said first local signal.

28. The network of claims 26 or 27 wherein said first function is multiplication.

29. The network of claim 28 wherein said first processing means comprises absolute amplification means followed by oscillator means to provide said processed output.

30. The network of claims 26 or 27 wherein at least one of said first and second oscillators comprise:
   a transistor having a collector, emitter and base, one of said collector and emitter coupled through inductive means and first capacitive means to a supply voltage, said base having said processed output applied thereto, said base further coupled to one of said collector and emitter through second capacitive means and said inductive means to provide a first feedback path, one of said collector and emitter coupled to the other of said collector and emitter through said first capacitive means to provide a second feedback path.

31. The network of claim 30 wherein said inductive means comprises a pair of inductors connected in series, said first capacitive means comprises of pair of capacitors connected in series between a node common to said pair of inductors and to said one of said emitters and collector, said second capacitive means comprises a single capacitor coupled between said node and said base, and said second feedback path is from a common connection of said pair of capacitors to the other of said emitter and collector.

* * * * *